United States Patent [19]

Spencer et al.

[11] Patent Number: 5,137,384
[45] Date of Patent: Aug. 11, 1992

[54] ERGONOMIC-INTERFACE KEYBOARD SYSTEM

[76] Inventors: Jeffery B. Spencer, Box-2636, La Jolla, Calif. 92038; Stephen L. Albert, 1660 Torrey Pines Rd., La Jolla, Calif. 92037

[21] Appl. No.: 827,143

[22] Filed: Jan. 27, 1992

[51] Int. Cl.$^5$ .............................................. B41J 5/10
[52] U.S. Cl. .................................... 400/489; 400/82; 400/682; 400/715
[58] Field of Search .................... 400/82, 88, 472, 473, 400/477, 479, 485, 486, 488, 489, 682, 715, 716; 235/145 R, 146; 341/22, 23

[56] References Cited

U.S. PATENT DOCUMENTS

| | | | |
|---|---|---|---|
| 3,305,062 | 4/1965 | Kihredge | 197/1 |
| 3,990,565 | 8/1974 | Felton | 197/98 |
| 4,661,005 | 1/1984 | Lahr | 400/489 |
| 5,067,834 | 11/1991 | Szmanda et al. | 400/82 |

FOREIGN PATENT DOCUMENTS

| | | | |
|---|---|---|---|
| 3700456 | 7/1987 | Fed. Rep. of Germany | 400/704 |
| 290078 | 12/1986 | Japan | 400/704 |

Primary Examiner—Edgar S. Burr
Assistant Examiner—Ren Yan

[57] ABSTRACT

Conceived with the human-engineering objective of overcoming Repetitive Motion Injuries such as Carpal Tunnel Syndrome. The solution, a system comprising a split-keyboard spaced laterally into vertically arranged co-operative keypad halves, optimally enabling the user to sit with the lightweight portable keyboard assembly laying directly upon their lap. Traditional keyboards orient operator's hands inducing a wrist-twisting, arm-extending stress while the stress-free ergonomic bodily position herein liberates one from such trauma by reorientation of the hands and arms to a non-pronated, unextended position. This correction involves the upper-arm draping naturally down from the shoulder with the forearm, set at a relaxed forward projecting right-angle, placing the Carpal-ligaments of one's wrists in a non-torqued, neutral position. Because weight of the extended hand/forearm is borne comfortably upon the narrow side (hypothenar-eminence) of the hand, this newly identified reorientation requires no appreciable musculature effort to maintain. The arrangement of keypad controls, with transverse adjustability to user's physique, serves to ameliorate onset occurrence of keyboard associated RMI-diseases. Utilizing visual-reference mirrors adjustable to a user's eye, enables them to readily reference any key-indicia or tracking-mouse hemisphere via convenience of natural mirror-image/-reverse-compensated character notation. The system universally interfaces with ordinary electronic keyboard connections, and employs a conventional (albeit split) Qwerty keyboard. It is likewise adaptable to other keyboard formats. Optional accommodation of an Accounting-panel (ten-key; with affixed visual-reference mirror) at the right or left of the keyboard-base, is achieved via a modularly invertible attachment upon either laterally extensile retractable-support member.

10 Claims, 2 Drawing Sheets

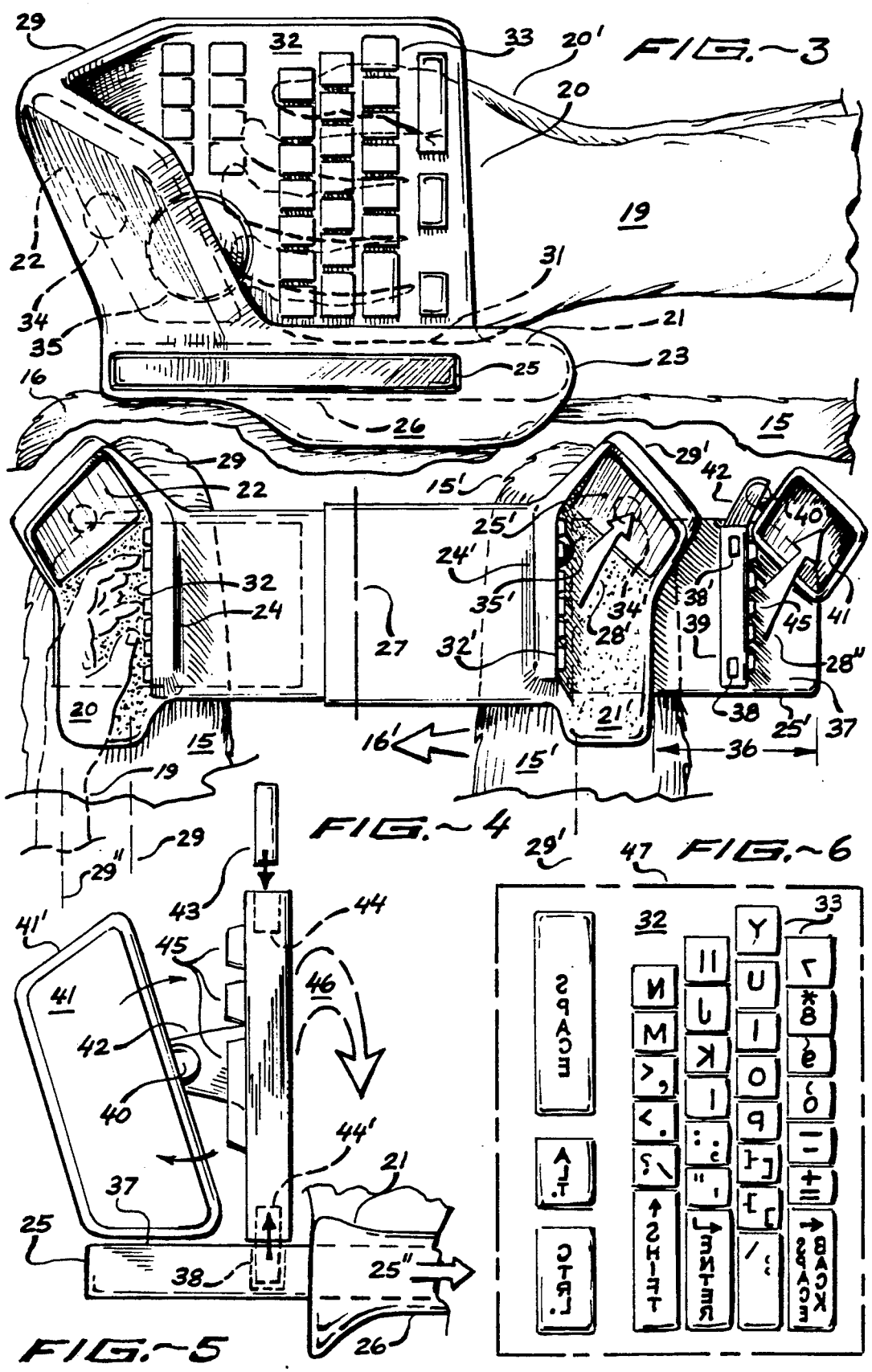

ERGONOMIC-INTERFACE KEYBOARD SYSTEM

I.) BACKGROUND OF THE INVENTION

This invention relates to keyboards of the divided type, whereby each hand is assigned a key group cluster; and in particular, this invention addresses the notion of dual vertically oriented keyboards.

Heretofore, there have been various interesting keyboard inventions having the apparent intent of improving the psychophysiological human-engineering aspects of efficient hand/finger mind coordination. However, none have actually addressed the currently more critical problem area traumatically impacting the physiopathology involved in intense repetative-motion tasks; particularly such task procedures involving one's upper extremities, —that is perse, the finger-thumb/hand/wrist/elbow/shoulder cooperatively articulated aggregation. Accordingly, in order to better understand the RMI(repetitive-motion injury)-disease pathogenesis involved in the occurance of so called Carpal-tunnel Syndrome, review of certain authorative medical articles as well as relevant prior patent-art is in order. For example, in the well respected American periodical "Occupational Health and Safety"(date?), Dr. S. J. Barrer-MD states that more study and information is now being directed toward job-induced cumulative-trauma disorders, than that known in the previous two-decades;—and carpal-tunnel syndrome(CTS) is the most devastating contender. He goes on to state that RMI induced CTS just a decade ago accounted for about 18% of occupational injuries, while more recently that figure has risen to some 48%. Dr. Barrer points out that in the past, using a typewriter meant occassionally pausing to make corrections by hand, rolling paper into and out of the carriage, pausing to look-up spelling of a word, etc.. These job "break interruptions" of repetitive-motion procedures are now becoming so automated, that as result, physical movement is much more intently repetitive—a word-processor operator may now perform some 23,000-keystrokes in a single uninterrupted period, with no relieving variation,—no "wrist rest" time. Dr. Barrer advises that the resultant stress is far more than the wrist was anatomically designed to handle. Although a single digital motion upon a modern touch-sensitive key may involve what seems a minor ¼-lb. of pressure, the cumulative RM/loading-factor in one period can extrapolate to some 6-tons of working pressure! Hence, Dr. Barrer goes on to say, it is such repetition without adequate recovery-time which causes pain, inflammation, and swelling in the wrist's carpal-tunnel region. Excessive repetitions in a given time segment deny the wrist sufficient time span interval to produce it's natural lubricating-fluid;—the resulting friction, leads to swelling and scaring. The swollen scar-tissue then presses against the median-nerve running directly through the carpal-tunnel immediately adjacent thereto. In time, pressure atrophies the nerve which control the thumb and first three fingers;—the hands thus painfully cease to function adaquately, and the worker can become permanently disabled at considerable distress and crippling expense to all involved. It has been estimated that a company of some 100-employees, an increasing proportion of which are engaged in repetitive-motion procedures, will expend $¼-million annually toward therapeutic treatment including carpal-ligament/incision-surgery and productivity lost to recover-time. In 1988, the U.S. Federal-agency OSHA(Occupational Safety and Health Admin.) determined it was time to aggressively penalize at least two major food-manufactures a combined total of $5.3-million, for alleged negligence in the face of knowledge about the dreaded RMI/CTS hazard. Ultimately, all this equates to higher cost of commodities for everyone, and Dr. Barrer summarizes by stating that prevention rather than treatment is the best productivity-enhancing approach;—unfortunately, nobody has heretofore offered a viable solution in overcoming this growing malady among keyboard operators. Accordingly, several other authoritative reference-articles have been filed with this invention-disclosure.

Toward addressing this data-processor's disease, there has been some notable invention activity, among which U.S. Pat. No. 4,774,966(filed-November 1986) discloses a simple "Carpal-tunnel Syndrome Screening-device", which tests of the right and left hands serves to indicate the individual's hand-strength both against a known "norm-factor" and possibly later against one's own pre-established strength quotient;—the purpose of which being to diagnose early onset of RMI/CTS. Rather than directly address the cause, subsequent thinking was directed toward orthopedically administering the symptoms, as in U.S. Pat. No. 4,883,073(filed-July . 1989), which sets forth a "Remedial-device for Treatment of CTS" which is a type of therapeautic-prosthesis in the form of a rather cumbersome support-splint appliance applied about the hand and wrist, proporting to help relieve pressure of swelling; so as to thereby enable a person having CTS to manipulate their wrist without further aggravating the ailment. Similarly, later U.S. Pat. No. 4,941,460(filed-November 1989) shows a "Carpal Brace" applied about the hand and forearm as a light-weight splint; again, purporting to limit flexion, hyperextension and ulnar deviation of the wearer's wrist, so as to allow a natural healing process to proceed,—unless permanent damage has already been realized. Albeit better than nothing, these devices cannot truly solve the problem.

Special keyboard layout inventions attempt only to relieve awkward illogical keyboard operation difficulties, primarily by dividing the early Qwerty-layout(-designated Sholes and Christopher's turn-of-the-century standardized upper-left keyboard-quadrant character sequence) into a centrally divided format; which now recognized improvements commonly referred to as the Dvorak(USA/circa-1932) and Maltron(L. G. Malt of England) formats, which approaches are substantially set forth in U.S. Pat. Nos. 3,507,376(filed-November 1967), 3,698,532(filed-August 1969), 3,945,482(filed-December 1973), 4,081,068(filed-October 1976), 4,310,254(filed-November 1980), 4,669,903(filed-April 1985), 4,824,268(filed-April 1987), and 5,017,030(filed-July 1986);—which largely endeavor to ease the problematical keyboard reach-frequency, by in some instances having the forearms positioned at an approximate right-angle to one another-,—such divisionally slightly rotated keyboards being incidentally discovered to somewhat relieve incidence of trauma to the wrist ligaments, especially by more obese persons. Still other inventors endeavored to address the keyboard problem via specially arranged, albeit still essentially horizontal, keyboards in which a "tickling" finger or thumb movement is largely exerted; such as is exemplified in U.S. Pat. Nos. 3,693,184filed-October 1969) and 4,265,557(filed-January 1979).

Next, another progression in keyboard ergonomics is defined in U.S. Pat. No. 4,378,553(filed-March 1981), wherein the divided-keyboard is set upon a common transverse platen so as to enable the user to space apart the horizontal keypads at a comfortable interval. Then U.S. Pat. No. 4,913,573(filed-August 1988) showed a divisional-keyboard physically arranged into two separate horizontal-keypads featuring portions wherein the keys are set on a vertical plane, so as to readily facilitate a more elaborate "tickling"-motion of the respective thumb and fingers. Also somewhat addressing the problem of relieving musculature tension, U.S. Pat. No. 5,004,196(filed-November 1989) shows dual laterally adjustable horizontal hand-palm rests relative to a substantially conventional horizontal keyboard.

Believed most somewhat relevant to the present invention hereof, is the disclosure of U.S. Pat. No. 3,990,565(filed-August 1974) describing a "Remote-control Bifurcated Typewriter-keyboard w/Universal Input Matrix Switch" showing a now outmoded special typewriter having a normally horizontal albeit substantially built-in divided-keyboard(conventional) arranged so that additional space may be optionally made therebetween for resting of text-copy. Two slightly different generic keypad variant embodiments are set forth, either of which may, if desired, be conveniently rearranged vertically at one's forward lateral left and right, one being retractable upon telescopic supports, the other outwardly via extensile-cord connections. Either vertical provision thereby having the "principal object" of enabling the operator to place them to each side upon a table or desk, so that text-copy may be conveniently layed therebetween, while the user views a suitably magnified periscopic copy-readout situated remotely forward of the operator in the main-housing. The dual keypads are not adaptable to be universally compatible with any other typewriter mainhousing, nor are they capable of laptop operation. That this invention never received commercial acceptance, is believed owing to the lack of provision for convenient visual character keyboard reference while typing thereon, nor is there provision for relaxed positioning of the hands/wrists/-forearms in a suitably supported manner, so as to address RMI/CT(which syndrome became identified years later).

Another considered relevant albeit optionally divided-keyboard art is found in U.S. Pat. No. 4,661,005 (filed-January 1984), which discloses a "Splitable-keyboard for Word-processing Typing and Other Information-input Systems", and (FIG'S. -2A/B, and 7C w/text ref's. found at Col. -7/lower and col.-8/upper) suggests that their built-in keypad units may be partially(each keypad comprised of two portions, one portion thereof always remaining horizontal) pivotally adjusted toward 45-degrees of slope (relative to a longitudinally oriented lateral incremental axes), thereby providing greater comfort to the operator's hands. Since declination to this extreme attitude by the user made reading of individual keytop character indicia to difficult, the inventor proposed additional like indicia be applied to the at once upwardly side-surface of each digital-key unit(FIG. -8A w/text ref. col.-9/lower), thereby making the key-indicia in this moderately inclined attitude more visually accessable. A further problem with the invention, was that it positioned the CRT (cathode-ray tube)-display to close to the user's eyes; which has been found to induce fatigue via eye-strain.

Still another reference, is found in U.S. Pat. No. 4,490,604(filed-September 1982), which shows a retractable-keyboard configuration for a terminal, whereby a second-keyboard is provisionally concealed intimately beneath the primary-keyboard surface, and is made longitudinally extensile/retractile according to user requirement.

Therefore, in view of the assessed limitations found in the preceding prior-art of interest, the inventors hereof have established a development enterprise under the mfg./mkt. auspices of "The VERTICAL" TM in LaJolla, Calif.

II.) SUMMARY OF THE INVENTION a.) In view of the foregoing discussion about the earlier invention art, it is therefore important to make it clear to others interested in the art that the object of the invention is to provide a split-keyboard(otherwise referred to herein as laterally half divided) system of substantially conventional typewriter format such as that of the well known Qwerty, or still other possibly more practical known keyboard formats, or even general command input keys such as may be associated with military electronics, industrial control-boards, aerospace control-boards, medical diagnostic control-boards, musical keyboards, etc.; wherein dual-opposed vertical-keypads are provided at an optimised human-engineered attitude, and whereby provision is preferably made for transverse repositioning upon a keyboard-base structure to a lateral displacement from the particular interfacing individual user's forward longitudinal shoulder center-line, to be ergonomically determined by the user.

b.) Another object of this dual-opposed/vertical-keypad keyboard system, is to provide an improved laterally half divided horizontal keyboard of substantially conventional alpha-numeric format for informational input relative to an existing computer unit, thereby enabling corrective alignment of a seated operator's critically essential straight ahead shoulder/arm-/hand/finger aggregation, thus ergonomically relieving physiologically induced(especially via the traditional pronated palm hand position) dibilitating carpal-tunnel(wrist ligament) stress syndrome now scientifically associated with keyboardists repetitive motion proceedures; whereby the special verticalized keypad arrangement hereof further reduces transitionary-motion proceedures associated with allied keyboard functions-;—hence, resulting in substantially improved user efficiency, accuracy, and productivity.

c.) Another object of this invention is to set forth a portable unitary keyboard frame of substantially light-weight rigid construction, adapted to conveniently lay comfortably across one's lap above the knee/thigh region during use, including special provision therewith by way of discrete left and right opposed hand support shelf portions thereto, by which to ergonomically conform to any given individual operator's particular torso dimensions;—the advantage of this manner of usage being in overcoming the stress inducing human-engineering heretofore unwittingly designed into traditional computer keyboard control arrangements, which thus failed to properly interplay with the operator's natural bodily structure(musculature/skeletal physio-mechanical) limitations. Moreover, the special provisions of the verticalized keyboard hereof, generally eliminates need for costly ergonomically adjustable keyboard furniture. Accordingly, the human-engineering advantage of this transversely compliant arrangement, resides in its ability to readily accommodate young children, whose much narrower shoulder/torso width falls well below that of even the minimal percentile width of the smallest female adult specimen.

d.) Another object of this invention is to set forth discrete spaced left and right hand keypad members, each extending substantially vertically up from said keyboard so as to present its verticalized panel face toward the lateral left and right respectively, while splayed in a vertical plane;—facilitating a substantially neutral(relaxed) wrist arc attitude, while providing a substantially neutral rotary wrist attitude, hence alleviating carpal-tunnel stress. And including a compact mirror arranged at an angle toward the operator and set closely aftward while immediately outward thereto said keypad structure, including substantially conventional adjustable mounting, the arrangement thus providing convenient instant eye reference to the thus verticalized individual finger-key positions.

e.) Another object of this invention is to set forth the preceeding features wherein is preferably included convenient lateral repositioning means, such as a male/female sliding or telescoping arrangement by which the respective vertical keypads may be finitely adjusted transversely according to the particular shoulder width and/or torso width dimension of any given user;—thereby providing more precise corrective ergonomic accommodation to the vital straight ahead projection of shoulder/arm(upper and lower)/hand/finger aggregation being newly identified herein.

f.) Another object of this invention is to set forth the preceeding features wherein the base keyboard(support frame) is preferably constructed so that the attendantly mounted internally spaced keypad members arranged near the opposite distal ends of the keyboard may be finitely repositioned(preferably slideable as in expansion/contraction) transversely in or out with respect to each other, thereby being fully adaptable to the particular torso width of any given operator;—hence, facilitating universal accomodation of the vitally critical(essential to effectiveness of the invention) straight ahead alignment projection of the operator's shoulder/arm/hand aggregation. g.) Another object of this invention is to set forth an invention of the previously described features wherein is also included provision of special dual opposed eye-reference mirror units, each closely arranged with respect to their left or right keypad, at opposite lateral positions, and at an angle preferably manually adjustable by the keyboard operator, so as to afford instant visualization of the hence verticalized keypad finger-key surface contact reference indicia thereon. The preferably planar mirrors are to be thus pivotally ball-mounted or attached in any conventional manner as to facilitate convenient orientation of the keypad panel area image toward the operator's eyes. Also, it is desired to include key surface indicia(generally alpha-numeric) imprinted in mirror-image fashion thereto, so as to read naturally to the operator. Accordingly, it is preferred the individual finger-key reference indicia be rotated approximately 90-degrees, so as to reflect in a substantially horizontal manner with respect to the longitudinal plane of the mutually supportive keyboard structure. Additionally, it is desired to provide a special shroud like framing about the described keypad-mirror members, thereby acting to protect a mirror from inadvertant maladjustment, while also rather advantageously integrating the respective members into a compact appearing structure. It is preferred that the resulting assembly serve to contiguously unite the keypad panel plane with the accompanying hand-(hypothenareminence portion) support-shelf portion, while well enshrouding the adjacent angled mirror member as well.

h.) Another object of this invention is to set forth an invention of the previously described features wherein is also included a substantially conventional ten-key accounting entry pad formation located upon a separate panel, wherein the accounting-panel preferably includes two spaced male-plug like members which preferably incorporate electrical contact entities, thereby enabling the keyboard operator to simply plug the accounting-panel into the keyboard in a vertical manner aligned vertically with either keypad panel(but spaced about three-inches outboard therefrom). Since the accounting-panel is utilized exactly in keeping with the ergonomic precepts herein conveyed for the vertical keypad members, provision of a similarly adjustable visual-reference mirror, along with like mirror-imaging of the finger-key character-indicia is preferred. Accordingly, it is preferred that incorporated extendably within the opposite laterally distal primary-shelf ends of the keyboard are secondary retractable subshelf member portions (preferably one at each end), which are thus normally retracted and substantially concealed back within the confines of the primary hand supporting shelf. Hence, when it is desired to utilize the accounting-panel, one merely slides the subshelf transversely outward about 3½-inches so as to reveal the receiving female receptacles (likewise preferably incorporating matching electrical contacts), and with the accounting-panel held in a vertical position, merely directed downward into fully plugged-in mounted position. Since it is found desirable to accommodate left hand operation of the accounting-panel by some users, like male-plug members may be provided at the opposite side of the accounting-panel, thereby enabling the panel to be invertably installed upon the left side subshelf (in mirror-image manner to the right side subshelf). So as to normally negate presence of extraneous male-plug entities extending upward from the unused side of the accounting-panel, the male members may be made detatchable (much in the manner of an ordinary snap-in telephone plug); —thereby enabling the double-ended male-plug portions to be simply reconnected into the female-receptacles at the opposite side of the accounting-panel.

III.) DESCRIPTION OF THE PREFERRED EMBODIMENT DRAWINGS

The foregoing and still other objects of this invention will become fully apparent, along with various advantages and features of novelty residing in the persent embodiments, from study of the following description of the variant generic species embodiments and study of the ensuing description of these embodiments. Wherein indicia of reference are shown to match related points given in the text, as well as the Claims section annexed hereto; and accordingly, a better understanding of the invention and the variant uses is intended, by reference to the drawings, which are considered as primarily exemplary and not to be therefore construed as restrictive in nature.

FIG.-3, is a left side/elevation-view thereof, including phantom outline exemplifying the special ergonomic relationship of a seated operator's hand;

FIG.-4, is an upper plan-view thereof, including reference outlines exemplifying the special ergonomic relationship of a seated operator.

FIG.-5, is an enlarged auxiliary detail elevation-view similar to FIG.-1, wherein is revealed the deployed left-hand ten-key panel mounting arrangement.

FIG.-6, is an enlarged detail elevation-view study of the right-hand keypad member, as it would appear if viewed directly in a transverse inward direction.

IV.) ITEMIZED NOMENCLATURE REFERENCES 10-the overall invention assembly (forward from existing computer housing)
11,11',11"-exemplified visual-display unit, standard plug/receptacle, standard electric-cord
12-existing exemplified desk surface
13-operator person
14/14'/14"-conventional operator seat-bottom/seat-back/ seat-base
15/15'-operator's thigh/knee regions
16/16'-left/right thigh/knee transverse movement ref.-arrows
17/17'-operator's left/right shoulders
18/18'-operator's left/right elbows
19/19'-operator's left/right wrists
20/20'-left/right hands
21/'-left/right hand support pads
22/22'-left/right visual-reference mirror (VRM's)
23/23',23"-left/right keyboard contiguous half portions, and ref.-adjustment arrow
24/24'-left/right contiguous keypad housings
25/25',25"-left/right retractable subshelf (for 10-key attachment), and retract arrow
26/26'-left/right concave underside resting portions of keyboard
27,27'/27"-longitudinal center operator and keyboard interface, associated R/L-leg alignment
28/28',28"-left/right visual targeting of keypad image, and display-screen
29/29'-left/right contiguously integrated mirror-shrouds
30-vertically neutral wrist and parallel hand reference-line
31-the hypothenar-eminence resting portion of the hand
32-outwardly opposed panel-face of keypad
33-typical exemplified standard finger-key
34/34'-exemplified adjustment-ball mounting
35/35'-exemplified left/right tracking-ball hemisphere (mouse)
36-extendable/retractable subshelf ref.-arrow
37-provisionally deployed hand-rest surface
38/38'-key-panel indexing mounts in the subshelf
39-ten-key panel module
40-invertibly cooperative ball-mounting example
41,41'-invertible mirror, and perimeter framing
42-invertible-hangerarm
43-removable male mounting connector prong
44,44'-female indexing mounting receptacles in the panel opposite ends
45-exemplified typical finger-keys
46-exemplified inverting movement ref.-arrow
47-keypad upper end region reference point

Figure 1:
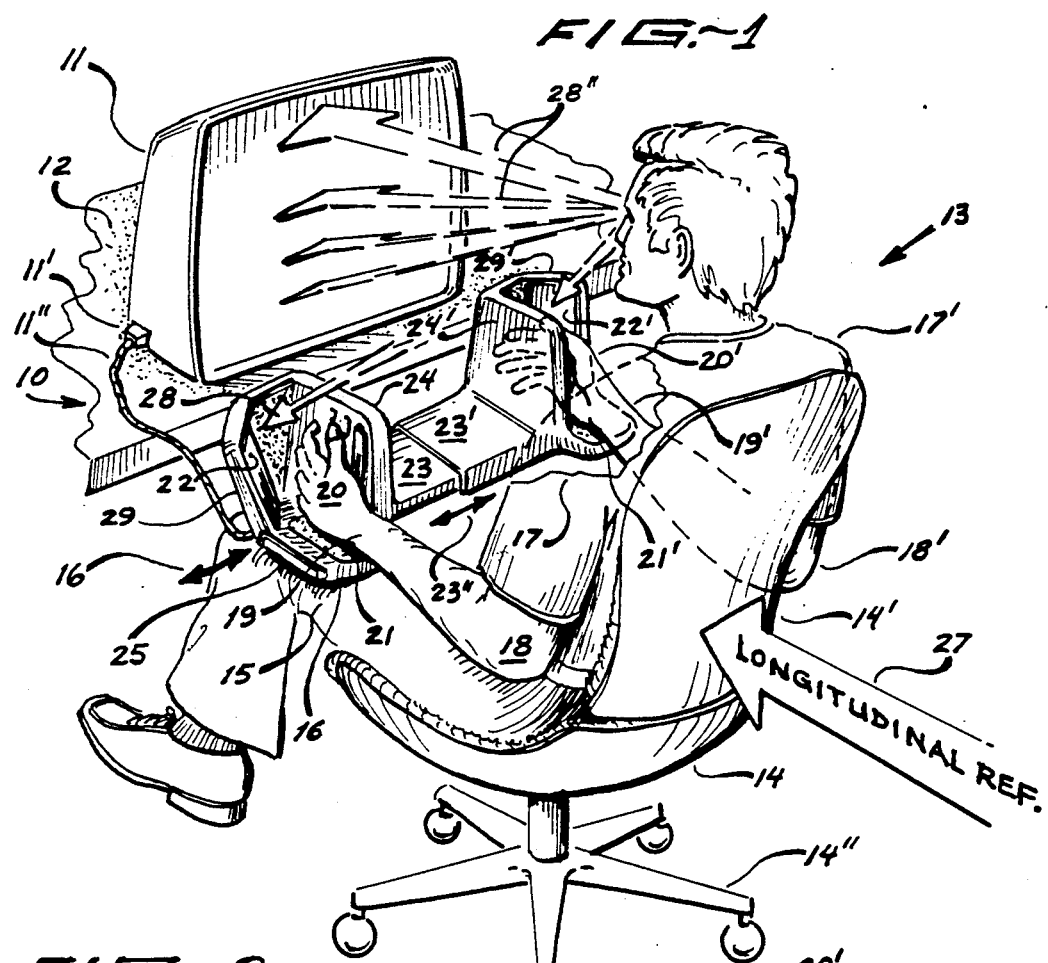
FIG.-1, is a pictorial perspective view looking over the left shoulder of a computer user shown seated at a preferred operating position in front of an exemplified computer apparatus.
Figure 2:
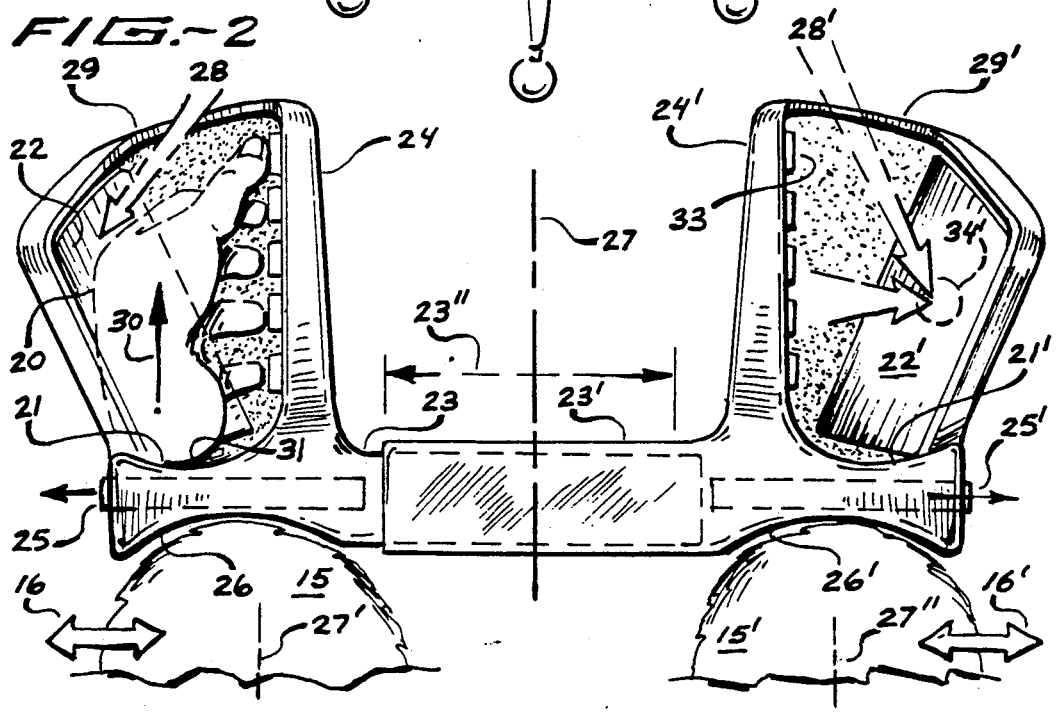
FIG.-2, is an elevation-view taken toward the forward-end nearest the operator, including broken phantom reference outlining indicating exemplified expansion/contraction of the opposed portions thereof.

V.) DETAILED DESCRIPTION OF THE PREFERRED EMBODIMENTS:

Initial reference is given by way of FIG.-1, wherein is exhibited the overall invention installation 10 in conjunction with an exemplified existing computer display unit 11 staged here upon a desk-top 12, is conventionally equipped with a interconnection plug 11' and associated electric-cord 11" extending here to the left side of the keyboard invention 10. This illustration serves to demonstrate how the operator 13 is poised comfortably in an ordinary office-chair 14 with his torso errect, shoulders 17/17' and arms naturally draped, so that his elbows 18/18' lay immediately at each side of his waist region (which dimension varies considerably among people). Note also how the arms are bent at an approximate right-angle enabling the forearm to extend naturally forward so that the wrists 19/19' are essentially vertical with the naturally opposed hands 20/20'. Note also how the operator's hands and eyes are able to readily coordinate 28/28'/28" in this especially relaxed attitude, while weight of the forearms and hands is entirely resting upon special right and left handsupport pads 21/21' which are formed as contiguous shelf like members extending laterally outward from the respective immediate vertical keypad members 24/24' which are formed as an integral part of the base keyboard platform portion 23/23'. Since width of the human operators torso vari considerably (generally about 12-inches), it is also shown at arrows 23", how the keyboard unit may be conveniently adjusted transversely in or out in order to accomodate a broad spectrum of shoulder/torso widths. FIG.-1 also reveals how naturally the keyboard assembly 10 lays over the operator's thighs just above the knees; and it is this overall arrangement of man/machine interface which so uniquely addresses a solution to earlier described RMI-disease, particularly carpal-tunnel syndrome.

Reference to FIG'S.-2/3/4 show in further detail how the critical relationship between the numerous standard finger-keys such as 33, now verticalized upon vertical panel 32, and the likewise naturally verticalized wrist/hand posture, at once work in total harmony with the forwardly straight ahead parallel projection, as is longitudinally referenced at 27. That this vital relationship is instantaneously adjusted by the user/operator themself, is further demonstrated in FIG'S.-2 and 4 whereby it is shown how the preferably concaved (channeled) underside resting regions 26/26', assisted via the slight gravity bearing of the extended forearm/-hand members, act in conjunction with one's voluntary thigh movement 16/16' to attain the proper if ultimately natural interval distance at reference point 23". No significant exertion of one's muscles is required to maintain this natural skeletally supported posture during a days working procedure, there being no unnatural rotary twisting(stressing) of the wrists toward the conventional pronated position of the hands; nor is there any need to uphold the arms and hands, since the weight thereof is entirely supported at 21/21' upon the naturally cushioned(meaty) hypothenar-eminence region 31 of the hands.

Because most operators prefer to enjoy an occasional visual reference orientation (often a subconscious effort) to the substantially conventional computer-keyboard format represented here, dual-opposed visual-reference mirrors (VRM's) 22/22' are also included. Since the seated torso height to thigh length ratio varies considerably among people, it is desirable to provide some manner of manually articulated adjustment to the fixed VRM's 22/22'; hence, the simple expedient of a substantially conventional ball-socket 34/34' arrangement is provided. Moreover, in order to assure freedom from further readjustment, it is preferred that a shroud like aftward protective housing structure 29/29' be formed contiguously from the keypad structures 24/24'. FIGS.-3 and 4 also reveal how the operator's fingers may readily access the conventional (albeit verticalized) visual-display screen tracking-ball 35 (which may be uniquely provided at both keypads 32/32'), as well as the usual computer-function keys shown immediately thereabove; exhibiting here as well that the transitionary-motion involved between finger-operation selections is very efficient, while the operator's hands may remain advantageously rested 31 upon the primary support-pad shelves 21/21'.

Although variations of this preferred keyboard-/keypad configuration may be constructed in either simplified, or, more complicated embodiments perhaps featuring a fully integrated ten-key accountant's panel; -it has been determined via human-engineering transitionary-motion studies, that provision of a built-in auxiliary pull-out extension for add-ons is the best general compromise solution. Accordingly, FIGS.-4/5 exhibit the preferred manner of facilitating a special modular-panel 39(which is an examplification of an otherwise substantially standard ten-key/accounting-panel) that preferably simply inserts vertically into stabilizing female-mounting receptacles 38/38' built into the normally unseen subshelf members 25/25' which deploy (preferably slidably) either left or right outward from the opposite transverse ends of the keyboard. Since the key-panel 39 is thus modularly invertible (that is, readily rotated transversely 180-degrees per ref.-arrow 46 from one side subshelf to the other), different users are able to thus conveniently adapt the key-panel to their left or right hand operating preference. Accordingly, it is desired that the male indexing prongs 43 be detatchable and made with some manner of substantially conventional snap-in catch device (not shown, but preferably similar to that found on conventional modern telephone-plugs, including the familar electrical contacts) so that they may be readily interchanged to either end of the key-panel 39; thereby eliminating awkward presense of the otherwise upwardly extending redundant male-prongs when the key-panel is installed at either transverse subshelf position. In use, it is seen that the VRM 41 also preferably includes a ball-socket 40 type mirror adjustment provision, which is constructed so as to readily facilitate readjustment to the individual operator's eye position when the panel is transfered to either the left or right hand stations. The particular advantage of this overall auxiliary panel arrangement resides in it's providing the very same manner of ergonomic performance previously attributed to the novel primary keypads 24/24'. However, in the case of operating the key-panel 39 as indicated in FIG.-4, the operator need only swing their right leg (in this depiction) slightly to the left (as per ref.-arrow 16') in order to bring the panel 39 into the transverse position normally occupied by the adjacent keypad panel 24'. Note here also that the key-panel 39 is shown deployed to the right a bit further than would actually be necessary (done for visual clarity purposes), but that the provisional hand-rest surface 37 offers the same convenience as adjacent primary surface 21'; while the transitionary-motion of the operator's right (here) hand moving between stages of the two immediately adjacent verticalized finger-key panels, is thus quite efficiently performed, thereby reducing fatigue during prolonged repetative-motion procedures.

Final reference is given to FIG.-6 by way of further explaination as to the particularly manner of mirror-image orientation preferred, the keypad panel exemplified here being essentially the typewriter like key functions of the right hand member. Thus note that the indicated end 47, which herein represents the top of the keypad panel, is traditionally found at the center region of a conventional pronated-hand horizontal keyboard. Accordingly, holding a mirror up to the illustration of FIG.-6 will effectively convey to one's eye the novel manner in which it is preferred the key format on panel 32 be presented to the operator.

Accordingly, it is understood that the utility of the foregoing adaptations of this invention are not necessarily dependent upon any prevailing invention patent; and while the present invention has been well described hereinbefore by way of preferred embodiments, it is to be realized that various changes, alterations, rearrangements, and obvious modi-fications may be resorted to by those skilled in the art to which it relates, without substantially departing from the implied spirit and scope of the instant invention. Therefore, the invention has been disclosed herein by way of example, and not as imposed limitation.

What is claimed of Proprietary Inventive Oirgin is:

1. An improved keyboard system, transversely adjustable, having laterally half divided keyboard units for inputting information to a computer or data entry unit, comprising:

a portable unitary keyboard frame of substantially rigid construction designed to optimally lay across any operator's lap during use, including means for alleviating Carpal-tunnel stress comprising:

a left half divided keyboard unit having a left hand keypad member extending substantially vertically upward from said keyboard frame and having a plurality of keys thereon facing to the left, a left hand support pad disposed on said keyboard unit adjacent said left hand keypad member for supporting the left hand of an operator during operation, and a first compact mirror adjustably mounted on said keyboard unit and spaced away from said left hand keypad member to the left thereof to reflect said left hand keypad member and left hand motion of an operator; and a right half divided keyboard unit having a right hand keypad member extending substantially vertically upward from said keyboard frame and having a plurality of keys thereon facing to the right, a right hand support pad disposed on said keyboard unit adjacent said right hand keypad member for supporting the right hand of the same operator during operation, and a second compact mirror adjustably mounted on said keyboard unit and spaced away from said right hand keypad member to the right thereof to reflect said right hand keypad member and right hand motion of the operator.

2. The keyboard system as in claim 1 wherein said vertical keypad member including repositioning means for transverse adjustment of said vertical keypad members on said keyboard frame.

3. The keyboard system as in claim 1 wherein said first and second compact mirrors being integrally connected to said respective keypad members.

4. The keyboard system as in claim 1 wherein said plurality of keys on each of said keypad members bearing reverse imaged character indicia.

5. The keyboard system as in claim 4 wherein said reverse imaged character indicia on said plurality of keys being arranged in a vertically readable orientation.

6. The keyboard system as in claim 1 further including a ball tracking-mouse having a hemisphere portion thereon for finger-tip operation by the user.

7. The keyboard system as in claim 1 further including means for attachment and removal of additional keypad member to either side of said keyboard frame.

8. The keyboard system as in claim 1 wherein said left hand and right hand support pads are disposed horizontally on said respective keyboard unit.

9. The keyboard system as in claim 8 wherein each of said half divided keyboard units comprising a separate rigid integrating housing to connect said keypad member, said support pad and said compact mirror together.

10. The keyboard system as in claim 1 wherein said keyboard frame including slide means to allow the lateral expansion and contraction of each of the half divided keyboard units.

* * * * *